July 7, 1936.   P. S. MORGAN   2,046,904
APPARATUS FOR PUMPING LIQUID AND SEPARATING GAS THEREFROM
Filed Dec. 22, 1932    4 Sheets-Sheet 3

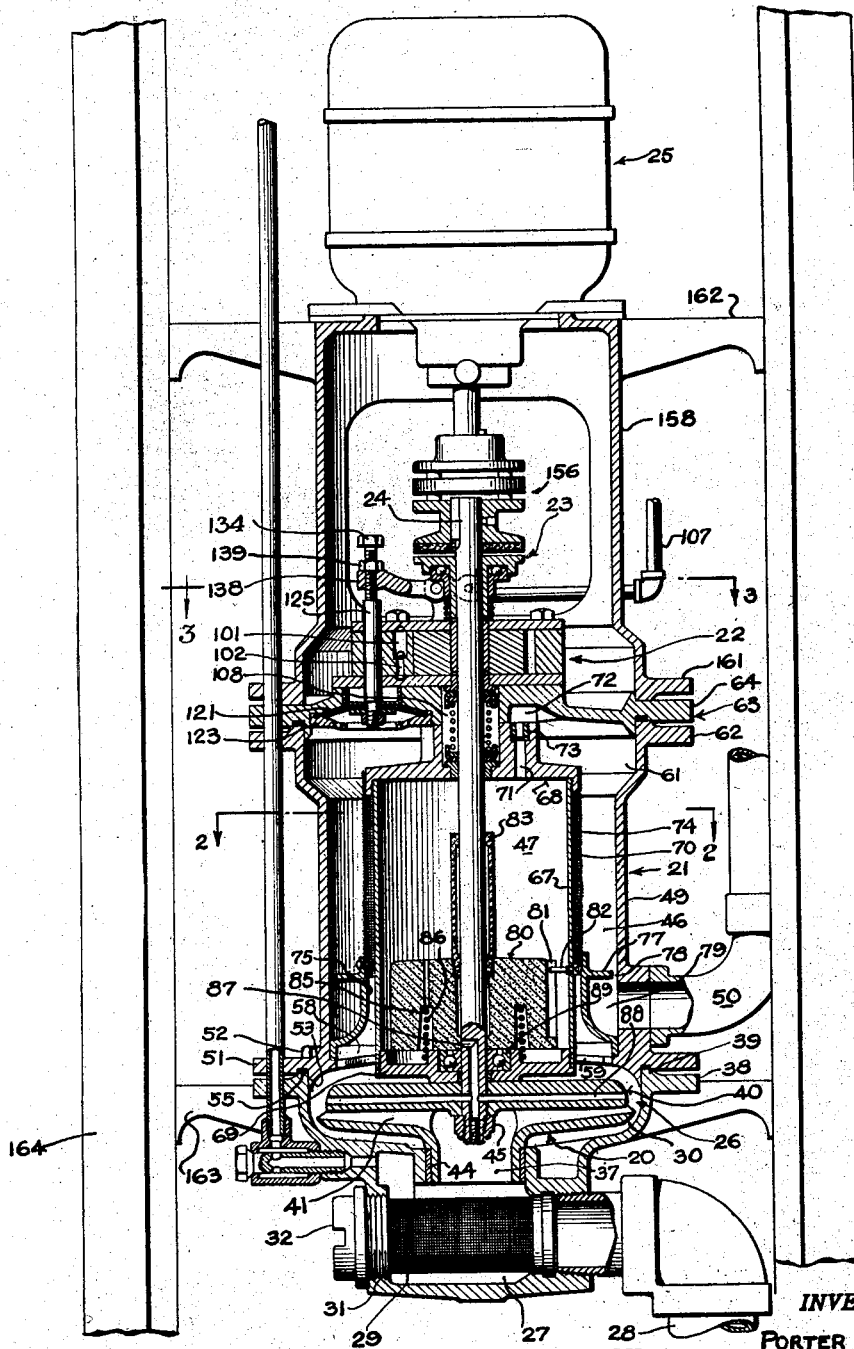

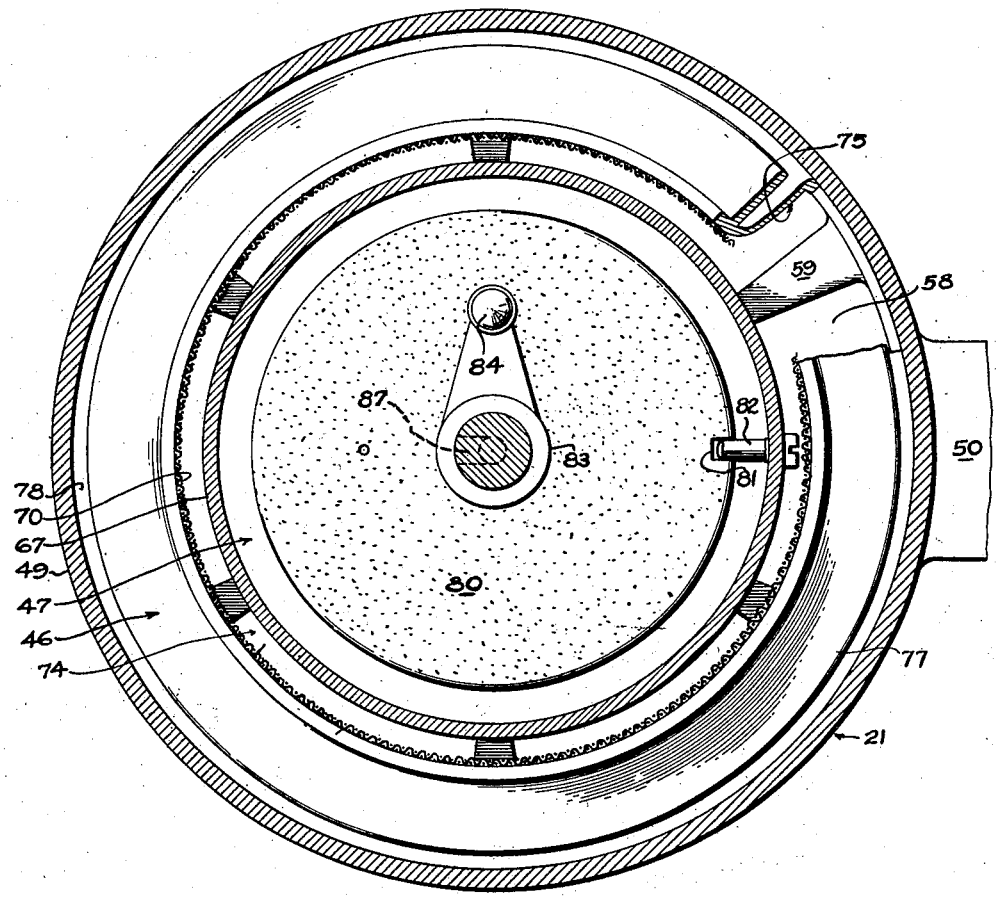
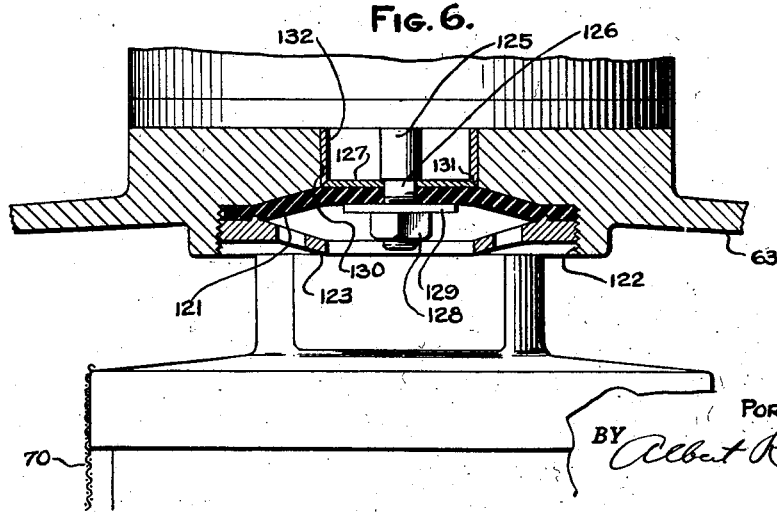

INVENTOR
PORTER S. MORGAN
BY
*Albert R Henry*
ATTORNEY

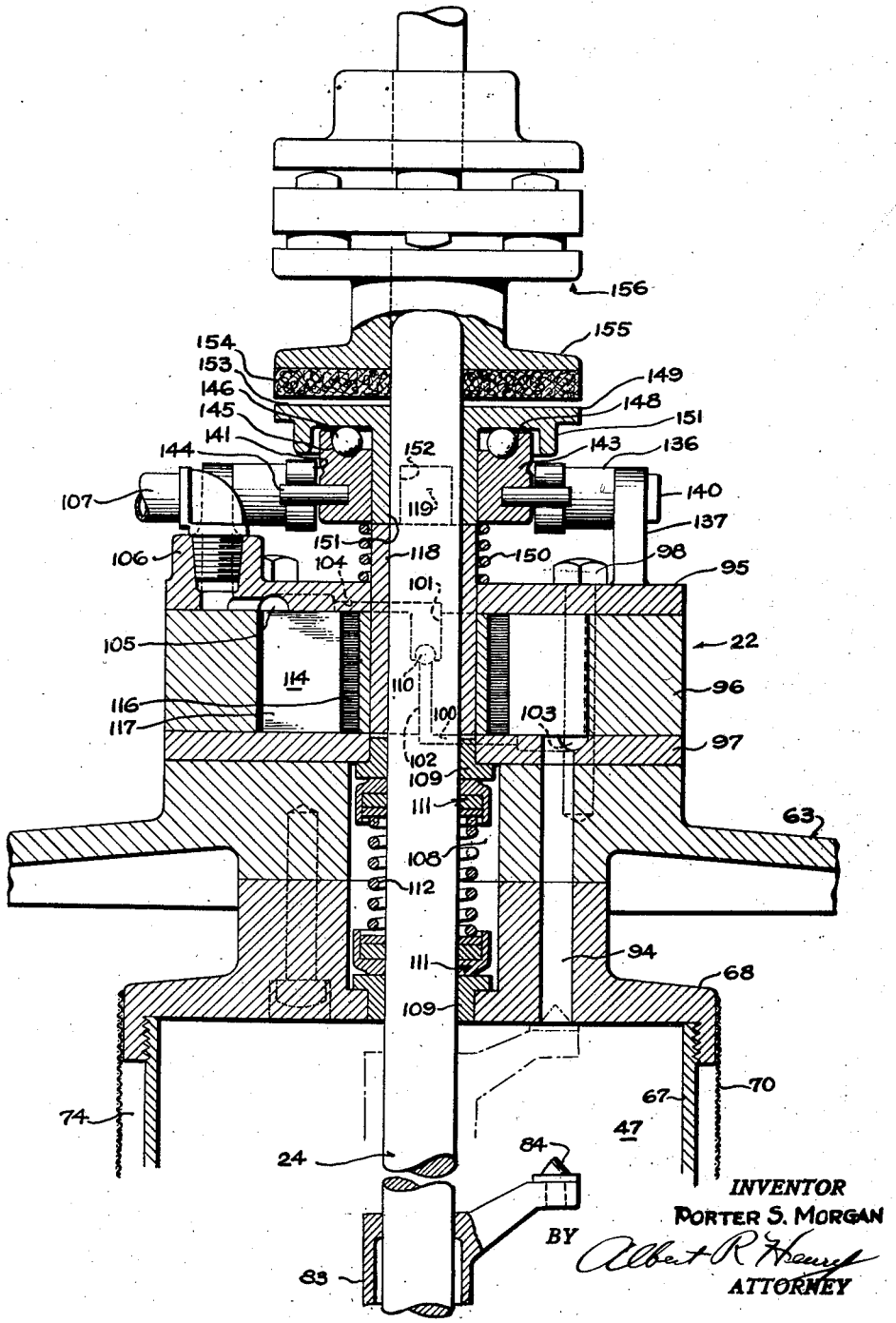

Patented July 7, 1936

2,046,904

UNITED STATES PATENT OFFICE 2,046,904

APPARATUS FOR PUMPING LIQUID AND SEPARATING GAS THEREFROM

Porter S. Morgan, Norwalk, Conn., assignor, by mesne assignments, to Liberty Share Corporation, Buffalo, N. Y., a corporation of New York Application December 22, 1932, Serial No. 648,400

14 Claims. (Cl. 103—113)

This invention relates to apparatus for separating gas from a body of liquid, and it has particular reference to separating means associated with a liquid pump.

It is one of the objects of the invention to provide an effective device for supplying liquid from a storage reservoir, or other source favorable to the inclusion of adventitious quantities of gas or air in the liquid, through apparatus for removing the included air or gas from the liquid body, so that there may be delivered a quantity of liquid which is not diluted by appreciable volumes of air. The invention finds one application in the dispensing of gasoline through a metering device, and, in such use, admits of the mutual association of the pumping and separating elements, but it will be understood that the invention is susceptible of other applications.

Other objects of the invention relate to the provision of improved separating means, in which may be embodied various features such as the provision of a filter pervious to the liquid, but relatively impervious to the gases, so that a housing of great size, or the provision of quieting zones of large volume, are rendered unnecessary. Withal, the separator is of sufficiently great capacity to prevent the development of excessive pressures, due to abnormal expansions under high temperature conditions. There is also provided a venting means for removed gases, which is not only operative to remove, continuously or intermittently, air separated from the liquid, but also to extract any gas bodies which may be entrapped in the pump itself.

Various other objects of the invention, and the advantages to be derived from the practical application of its principles, will be made more apparent from a perusal of the following detailed description of a specific embodiment thereof, wherein reference is made to the accompanying drawings, in which:

Fig. 1 is a vertical section through the assembled device;

Fig. 2 is an enlarged cross section on the line 2—2 of Fig. 1;

Fig. 5 is a vertical section on the line 5—5 of Fig. 3, showing the air pump and associated parts.

Fig. 6 is an enlargement of a vertical section through the control diaphragm as shown in Fig. 1.

Figure 3:
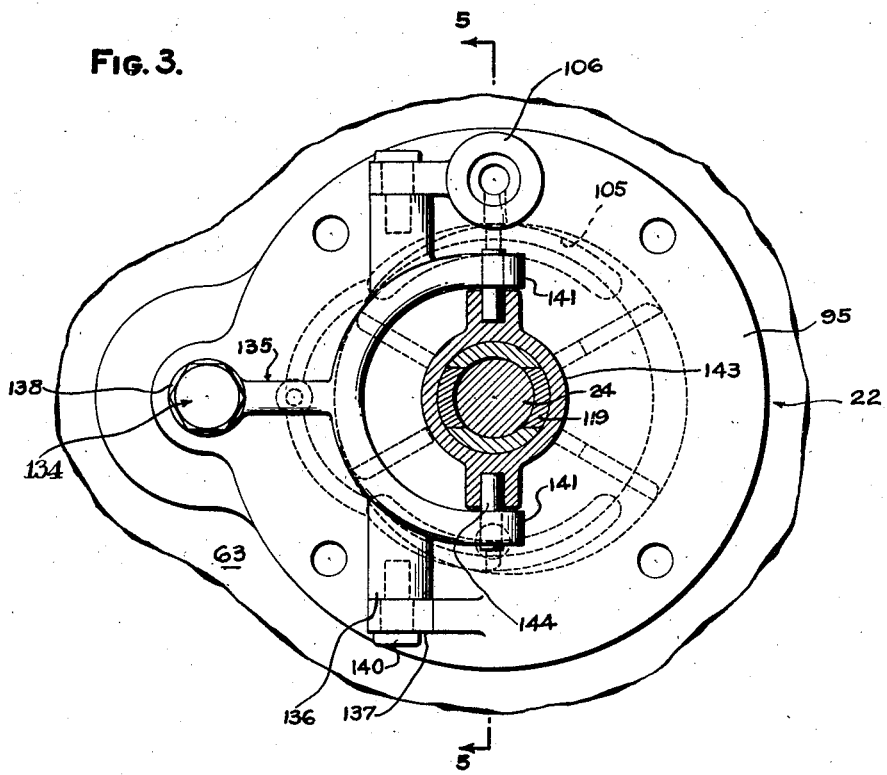
Fig. 3 is an enlarged cross section on the line 3—3 of Fig. 1, showing the air pump in elevation with the other portions of the device broken away.

The apparatus as shown in Fig. 1 comprises a plurality of interconnected housings forming a rigid assembly and containing a centrifugal supply pump 20; an air separator 21 supplied with fluid by the pump; a primer or air pump 22 of the displacement type for removing abnormal quantities of air from the system; and a pressure responsive clutch device 23 for controlling the operation of the pump 22. Both pump devices are driven by a motor 25 through a suitable shaft 24, which extends through the housings.

The centrifugal pump 20 (Fig. 1) comprises an impeller housing 26 formed at its lower extremity with an input chamber 27 which is suitably connected to an input pipe 28 leading to a storage tank. Liquid entering this chamber passes through a removable tubular strainer 29 inserted in an opening 31, normally sealed by a nut 32. The open side of the housing is internally formed to provide an impeller chamber 30 communicating with the input chamber 27 through a throat 37. The upper face of the housing 26 is flanged, as indicated by the reference numeral 38, and is formed with a circular pad 39 to provide a connection to the separating unit.

The impeller 40 of the pump is advantageously of the closed type, having a plurality of hollow arms 41 radiating from a central inlet portion and communicating with the input chamber 27 through the throat 37. The inlet portion of the impeller is provided with an external bushing 44 providing a radial bearing for engagement with the inner wall of the throat 37. The impeller is keyed to the shaft 24 and is retained against axial movement by a nut 45.

The separator 21 is formed with an outer chamber 46 (Figs. 1 and 2) adapted to receive liquid discharged by the pump 20 for gravitational separation of any air contained therein, and an inner chamber 47, through which separated air may be removed from the system, and any liquid carried thereby may be returned to the pump. A liquid outlet pipe 50 is in communication with the outer chamber through which the separated liquid is directed to suitable metering and dispensing units for disposal.

The outer chamber 46 is defined by an inner cylindrical wall portion separating this chamber from the inner chamber 47 and an outer housing 49, which is provided at its lower extremity (Fig. 1) with portions adapted to receive and to be secured to the upper face of the impeller housing 26, by means of a radial flange 51 contacting the flange 38 and secured thereto by means of bolts 52. An annular groove 55 is formed in flange 54

51 for receiving a packing which engages the face of pad 39, the packing being of sufficient thickness to provide a fluid-tight joint when the flange 51 and the pad 39 are in contact. A sleeve portion 53 is formed on the housing 49 to provide a substantial continuation of impeller chamber 30 and it terminates internally in an annular opening or separator inlet port 58, across which extend arms 59 to provide a mounting means for the structure of the inner chamber 47, hereinafter more fully described.

The upper end of the housing 49 (Fig. 1) is enlarged to provide an internal air receiving pocket 61 and a radial flange 62, which is similar in formation to the flange 38 of the pump housing 26. A head 63 having an annular flange 64 similar in construction to the flange 51 of housing 49 serves to cover the end of the housing, and is secured thereto to provide a fluid-tight joint.

The previously mentioned inner chamber 47 consists of a tube member 67 and caps 68 and 69 secured to the upper and lower ends thereof, respectively. The inner chamber member thus formed is mounted concentrically within the outer housing 49, and about the shaft 24. Screws secure the upper head directly to the cap 68 of the outer housing 49 (Fig. 5) while the lower end of the tube member 67 is secured against movement by engagement with the inner extremities of the previously described arms 59, formed on the lower extremity of the housing 49. The upper cap 68 is provided with an air inlet opening 71 entering into the air pocket 61 of the outer chamber 46 by means of a passage 72 formed in the housing head 63. A removable nipple 73, having an opening of reduced diameter, is screwed into the opening 71 and provides a simple means of changing the size of the opening.

The outer wall of the tube member 67 (Figs. 1, 2 and 5), together with a tubular fine mesh screen 70 mounted about the upper cap 68, provide therebetween an air directing chamber 74 for the outer chamber 46. The chamber 74 receives the full discharge of the pump 20, which is directed thereto by a circular baffle member 75 mounted on the inner wall of the housing 49, and which is suitably secured to the screen 70. It has been found that, when liquid admixed with small quantities of air enters a relatively narrow chamber, such as the chamber 74, the liquid under pressure will readily pass through any portion of the screen, while the air will form in globules and roll up to the top of the screen before passing therethrough. In the present device, the air thus forced out will rise and enter the air pocket 61 of the outer chamber, and the liquid will seek a level in the lower portion.

A radial baffle ring 77 is formed on the baffle member 75 (Figs. 1 and 2), and, in cooperation with the inner wall of the housing 49, forms a restricted circular opening 78. The portion of the housing 49 below the ring 77 provides a secondary receiving chamber 79 in the outer chamber 46, to which the output pipe 50 is connected. This arrangement prevents excessive turbulence in the outer chamber, since, although the opening 78 is proportioned to receive the output of the device, its relatively narrow passage offers a substantial restriction to surges of liquid. This insures a stable liquid level in the outer chamber during normal operating conditions, which encourages the separation of the extremely small quantities of air which may have escaped with the liquid.

The separated air or gas is forced into the inner chamber 47 through passage 72 and opening 71 in the cap 68. Quantities of liquid are occasionally forced into this chamber with the air and accumulates in the bottom thereof, whereupon, when a certain liquid level is reached, a valve device is actuated by the liquid to permit excess portions thereof to be withdrawn.

The valve device (Figs. 1 and 2) consists of a solid cylinder 80 of a material suited for immersion in gasoline, such as an artificial resin, which is slidably mounted on shaft 24 and which normally rests on lower cap 69 of the inner chamber. The outer wall of the cylinder 80 is formed with a slot 81 adapted to slidably receive a stud 82 screwed through the tube member 67, to prevent the cylinder from rotating with the shaft. A tube 83 is secured to the upper end of the cylinder and is formed at its upper extremity with a suitable bracket for mounting an emergency valve 84, which under certain operating conditions is adapted to close the air passage 94, as hereinafter more fully described. (See Figs. 2 and 5.) An annular recess 85, formed in the bottom face of the cylinder, receives a compression spring 86, mounted on the cap 69. The lower cap 69 of the inner chamber is flanged, both to provide a spring seat and an internal mounting for a ball bearing 89, the inner race of which is mounted on the shaft 24. The spring 86 functions to compensate for difference in specific gravity between the float assembly and the gasoline, so, when the lower portion of the inner chamber 47 is flooded, the cylinder will rise on the shaft 24, due to the urge of the spring 86 plus the urge of the liquid displaced by the cylinder. The shaft contains intercommunicating axial and radial portions providing a gasoline return passage 87 connecting the inner chamber 47 to radial passages 88 provided in the impeller 40. The passage 87 is normally closed to the inlet casing by an internal sleeve portion of the cylinder 80. However, when the cylinder is in an elevated position, the passage is open and liquid is rapidly withdrawn from the inner chamber through the passages 88 by centrifugal action, thus causing the cylinder 80 to be restored to its lower position.

Figure 4:
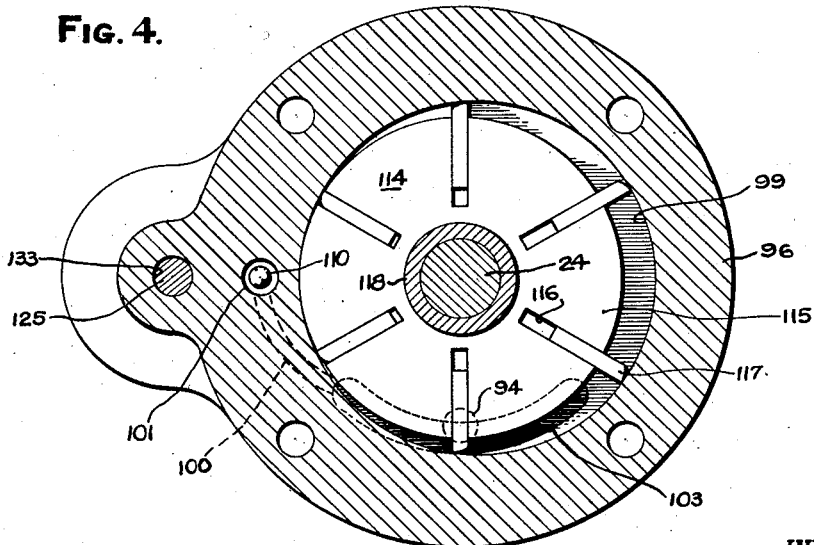
Fig. 4 is a cross section through the air pump.

The previously mentioned air pump 22 (Figs. 3-5) is directly mounted on the upper head 63 and it is in fluid communication with the inner chamber member 47 by means of an air escape passage 94 (Fig. 5) which extends through both the upper head 63 and the underlying upper cap 68. The housing for the pump 22 is fabricated of an upper plate 95, a chamber member 96, and a lower plate 97, all of which are secured to the upper head 63 by screws 98. The chamber member 96 contains a cylindrical rotor chamber 99 formed eccentrically to the shaft 24 (Figs. 3 and 4). The wall of the chamber is provided with a vertical passage 101 leading into a smaller passage 102, which in turn is in communication with the air escape passage 94 by means of a passage 100 and air input port 103 provided in lower plate 97. The passage 101 is in communication with an air vent pipe 107 through the passage 104 in the upper plate 95, the latter passage entering a vertical tapped hole in a boss 106 into which the vent pipe 107 is screwed. A ball check valve 110 is mounted in the passage 101 (Fig. 5) and is adapted to seal the passage 102 when negative pressures are present therein. The upper plate 95 contains an output port 105 on the opposite side of the housing to the input port 103 which is also in communication with the pipe 107 through the passage 104.

The lower plate 97 covers a gasket chamber 108 (Fig. 5) provided by central bores in upper head 63 and upper cap 68. Both the upper cap 68 and the plate 97 contain bearings 109 for the shaft 24. Gasket units 111 are retained against each bearing by a compression spring 112, thus rendering the bearings fluid-tight.

A rotor 114 (Fig. 4) is mounted in the auxiliary pump housing and comprises a body member 115 containing radial vertical slots 116, in each of which a vane 117 is slidably mounted. This unit fits with slight clearance in the eccentric chamber 99 and is secured to a sleeve member 118 which is in turn rotatably mounted on the shaft 24. The sleeve member 118 extends through the upper plate 95 and terminates in a pair of opposed spline portions 119 for connection with a clutch member hereinafter described.

The rotor 14 is intermittently operated by means of a clutch in response to pressure conditions existent in the separator 21. The control for the rotor, as more clearly shown in Fig. 6, comprises a flexible diaphragm 121 mounted in a threaded seat portion 122 of the upper head 63, and secured by means of a nut 123. Both nut 123 and the seat portion 122 are formed to conform to the upper and lower positions of the diaphragm to support the same against rupture. A rod 125 is shouldered as indicated by the numeral 126 and a washer 127 is mounted against the same in contact with the upper surface of the diaphragm 121. A nut 128 secures the diaphragm between a washer 127 and a second washer 129. The washer 127 is formed with a bevelled seat 131 and such portion is adapted to seat on a corresponding bevelled portion on a tube 132 pressed into an opening 130 in the head 63.

The rod 125 extends upwardly through a guide passage 133 (Fig. 4) formed in the auxiliary pump housing, and it terminates in an internally threaded portion, adapted to receive an adjusting screw 134. The rod is thus mounted for upward movement under urge of the diaphragm 121, to operate a clutch lever 135, (Fig. 3) which is provided with pivot portions 136 rotatably mounted on lugs 137 of the upper plate 95 by the studs 140. One end of the lever is provided with a threaded portion 138 engaged by the threads of screw 134 and locked by a lock nut 139, while the opposite end of the lever is bifurcated to provide arms 141 (Figs. 2 and 3). The extremities of the latter arms are slotted and pivotably engaged with opposite sides of a thrust collar 143 by pins 144. The collar is formed with a race 145 at its upper face in which balls 146 are mounted for contact with the face 148 of a clutch member 149.

When the rod is in its upper position (Fig. 1) the clutch hereinafter described is thrown out, while, when pressure on the diaphragm 121 is released for any reason, a clutch operating spring 150 in engagement with thrust collar 143 (Figs. 1 and 5), is released to move the collar upwardly and re-engage the clutch, thus rendering the air pump 22 operative.

The clutch member is provided with a depending sleeve portion 151 (Figs. 3 and 5) rotatably mounted within the thrust collar 143 and having a central orifice for rotatably receiving the shaft 24. Opposite slotted portions 152 are provided at the lower extremity of the sleeve portion for receiving the described spline portions 119 of the auxiliary pump rotor. A clutch face 153 of the clutch member is adapted to engage a clutch facing 154, which may be mounted on any suitable member secured to the shaft 24, as, for example, a flange 155 of a lower half of the flexible coupling 156 connecting the motor shaft to shaft 24.

The motor 25 is mounted on a cylindrical pedestal 158 having a motor pad for receiving the motor mounting bolts at its upper extremity, and having a flange 161 at its lower extremity, secured to the flange 64 of the upper head 63. Both the motor pedestal 158 and the centrifugal pump housing are provided with radiating mounting arms 162 and 163 respectively, whereby the entire device may be supported in a suitable structure for operation. For example, when the device is utilized in a gasoline dispenser the extremities of the arms may be secured to the usual upright channel frame members 164 of a dispenser casing.

*Operation*

The liquid supplied to the separator 21 by centrifugal pump 20 is separated into two bodies, as heretofore mentioned, an air or gas body, which usually occupies the air pocket 61 of the unit; and a liquid body, which reaches a level below the air body. The air and liquid bodies, continuously supplemented by the action of the arms 41 of impeller 40, are continuously drained during normal operation of the device. The air escapes through the inlet opening 71 (Fig. 1) into the inner chamber 47 from where it is either forced or pumped out to the vent pipe 107; the former condition prevailing when normal pressures are present within the unit, and the latter when the pressures drop below normal to a substantial degree. Referring to the first condition mentioned above, the air or gas is forced by back pressure through the passage 94 (Fig. 5), where it is shunted past the auxiliary pump through passages 100 and 102, to lift the ball valve 110, and from there through passages 101 and 104 to the vent pipe 107. This escape circuit is obviously only operative while the pump 20 supplies the back pressures necessary to expel air in the system. Inasmuch as the centrifugal pump 20 is rendered inoperative by the presence of abnormal quantities of air in the supply, it may be assumed that the described circuit is only operative to vent normal quantities of air.

The blocking of the centrifugal pump by such excessive quantities of air immediately effects a reduction of pressures in both outer and inner chambers of the separator 21, and also upon the diaphragm 121. This decreases the load applied on the clutch operating spring 150 by the diaphragm 121 through rod 125 and clutch lever 135, and permits the spring to raise the clutch member 149 and engage the face 153 thereof with the rotating clutch facing 154 on the shaft 24. The auxiliary pump rotor 114 is thus connected to the shaft 24, since the spline and notch connection between the clutch member 149 and sleeve 118 of the rotor connects these members for unitary rotation. Specifically, the air pump is somewhat similar to the usual eccentric displacement pump with the exception that the vanes 116 are retained in contact with the walls of its chamber by centrifugal force.

The auxiliary pump 22 (see Figs. 3–5) thus operating, withdraws air from both the separator 21 and the impeller housing 26 through the normal path described, that is, through outer chamber 46, passage 71, inner chamber 47, and into the pump input port 103 through passage 94. The air pump rotates in a counterclockwise direction (Figs. 3 and 4) and conveys the air thus received from its input port to its output port 105 for final disposal through passage 104 and vent pipe 107. Simultaneously, the normal air escape passages 100 and 102 are closed against circuiting action by the seating of the ball check valve 110 by the suction head of the pump.

When the pump 22 withdraws a sufficient quantity of air from the system to flood the centrifugal pump chamber 30 with liquid, the impeller 40 therein is immediately rendered operative to continue the fluid supply to the separator, whereupon pressures are again built up to normal and the diaphragm 121 is forced to its upper position, thus moving the rod 125 upwardly to operate the clutch lever 135, causing the movement of the thrust collar 143 downwardly against the force of the spring 150, to disengage the clutch and thus discontinue the operation of the air pump 22.

During operation of the separator under either of the described conditions, small quantities of liquid are introduced into the inner chamber 47, which, if not removed, would ultimately flood this chamber and admit liquid to the auxiliary pump and the air inlet passage, from where it would be forced out of the vent pipe 107. Such effect would not only entail a loss of liquid, but in the use of the device with inflammable liquids, such as gasoline, a fire hazard would result. The float operated valve 80 in the inner chamber 47 provides means for periodically returning excess portions of fluid to the centrifugal pump. When the liquid level in the inner chamber reaches a level sufficient to raise the cylinder 80 with the aid of spring 86, the return passage 87 is exposed for venting of liquid into the centrifugal pump chamber, by means of the secondary set of arms in the impeller heretofore referred to as the radial passages 88. Under these conditions the float is maintained at a level above the passage 87 until the liquid is withdrawn. The fact that the cylinder 80 is slidably mounted on the rotating shaft 24 insures its proper functioning as it cannot under the circumstances bind or "freeze" on its mounting.

The inner chamber 47, in addition to its described functions, acts as an expansion chamber for the system, since, as heretofore mentioned, during normal operation of the centrifugal pump the contents thereof consist almost entirely of separated gases. When the centrifugal pump is at rest, however, other conditions are attainable; for example, a sudden rise in outside temperature will cause the expansion of not only the contents of the separator unit but of the fluid in the entire system. This will cause the flooding of the inner chamber with liquid, which supplants and vents the air therein through the usual exit. The chamber 47 is so proportioned that its available gas storage volume is in excess of the amount of fluid it would receive under the most severe expansion condition.

When the reverse of the above described conditions prevails, that is, during a sudden drop in outside temperature, the inner chamber 47 is placed under a negative pressure which would ordinarily result in the reception of air through vent pipe 107 and the vent passage circuit communicating therewith. This is prevented by the seating of the ball check valve 110 in its passage, thus closing the circuit to air intake.

It is anticipated that under unusual conditions not above comprehended, or upon failure of some portion of the device, liquid could completely fill the inner chamber, whereupon the pump 22 would receive the same. In this event the valve 84 acts as a safety device by entering and blocking the air passage 94 under urge of the float 80. Under normal oprating conditions, however, the float never rises to such an extreme position, since the liquid is drained through the passage by centrifugal action in passages 88 at a more rapid rate than it could enter the inner chamber.

I claim:

1. Apparatus for separating gas from liquid, comprising a separating unit having a pair of chambers, a conduit connecting said chambers, means for feeding liquid containing gases into one of said chambers for gravitational separation into gas and liquid bodies and for disposal of said gas body into the remaining chamber through said conduit, an outlet passage from said first chamber for the separated liquid, a gas pump in communication with the remaining chamber and operative to remove gases therefrom, drive means for the gas pump, means responsive to pressure conditions in said first chamber for connecting said pump means to said drive means, a liquid return conduit communicating between said liquid feeding means and said other chamber, a valve for opening or closing said conduit, and a float device for operating said valve, whereby incidental quantities of liquid deposited in said other chamber are returned to the feeding means.

2. Apparatus for separating gas from liquid, comprising a separating unit having inner and outer chambers, a conduit connecting said chambers, a drive shaft extending through said inner chamber, a pump connected to the drive shaft and communicating with said outer chamber for supplying liquid thereto for gravitational separation into gas and liquid bodies and for disposal of the gas body into the inner chamber through said connecting conduit, a gas venting conduit in said inner chamber, a liquid return conduit communicating between said inner chamber and said supply pump, a valve for opening or closing said conduit, and a float device for operating said valve, said float device being slidably mounted on said drive shaft.

3. Apparatus for separating gas from liquid, comprising a separating unit having a pair of concentric cylindrical chambers, a conduit connecting said chambers, a drive shaft extending axially through the inner chamber, a centrifugal pump casing secured to said separating unit, an impeller therefor secured to said drive shaft, an output passage for the pump in communication with the outer chamber, a connecting passage in the impeller end of the drive shaft including a radial inlet port opening into said inner chamber for connecting said pump casing to the inner chamber, a float controlled valve in said inner chamber for controlling said connecting passage, and an air vent passage from said inner chamber to the atmosphere.

4. Apparatus for separating gas from liquid, comprising a centrifugal pump, drive means therefor, a separating chamber supplied by the pump and having an outlet for separated liquid, a second chamber communicating with the first chamber through a restricted passage for the separated air, a conduit in the second chamber for conveying separated gases therefrom to the atmosphere, means for removing abnormal gas volumes from the first chamber and the centrifugal pump when said pump is rendered inoperative thereby, comprising a displacement pump in communication with the second chamber and means responsive to pressure conditions in the first chamber for connecting the displacement pump for operation by said drive means, and means for recovering condensed liquid in the second chamber comprising a passage between the second chamber and the centrifugal pump, and a float controlled valve in the second chamber for closing said passage.

5. Liquid pumping and gas separating apparatus comprising a centrifugal pump including a rotor and a casing therefor, a drive shaft for the rotor, an inlet port in the casing in communication with the rotor, a discharge passage leading from the casing, a separating chamber spaced from and in communication with said casing through said discharge passage, a liquid discharge line in communication with said chamber, a second chamber in fluid communication with said first named chamber, a conduit of restricted section for effecting said fluid communication, an air vent formed in said second chamber, a check valve disposed in said air vent, whereby incondensible gas under pressure greater than atmospheric may escape from said chamber and flow of air into said chamber is prevented when the pressure therein is less than atmospheric, a vacuum pump, clutch means for connecting said vacuum pump to the drive shaft for the centrifugal pump, means responsive to pressure within the first named chamber for operating said clutch and thereby connecting or disconnecting said priming pump, a conduit connecting the suction side of the vacuum pump to said second named chamber, and a vent line connected to the discharge side of said vacuum pump.

6. Liquid pumping and gas separating apparatus comprising a centrifugal pump, said pump being provided with inlet and outlet ports, a gas and liquid separating chamber connected to the outlet port of said pump, a liquid discharge line connected to said chamber, a second chamber disposed within said first named chamber, a conduit of restricted section connecting the chambers at a point remote from said discharge line, means in said second chamber for venting air passing thereinto, a float disposed in said second chamber, a return line extending from the bottom of said chamber to centrifugal pump means operating in unison with said centrifugal pump, whereby liquid entering said second chamber will be returned to the outlet port of the centrifugal pump, and means controlled by said float to close said conduit when liquid in said second chamber reaches a predetermined level.

7. Liquid pumping and gas separating apparatus comprising a centrifugal pump including a drive shaft, a rotor connected to the drive shaft, and a casing enclosing the rotor, said casing being formed with an inlet port for admitting fluid to the inlet of the rotor and a discharge port for fluid passing through the rotor into the casing, a chamber in fluid communication with said discharge port to receive the fluid discharged by the pump, said chamber being formed with a baffle adjacent the discharge port and a liquid discharge line on the opposite side of said baffle, whereby said chamber serves to effect the separation of liquid from incondensible gas, a second chamber, a conduit of restricted section connecting said chambers at the upper portions thereof, an air vent in said second chamber, a vacuum pump connected to said air vent, clutch means responsive to pressure conditions in said first chamber for connecting said vacuum pump to said shaft when predetermined low pressures exist in said chamber, a liquid conduit connecting said second chamber with said centrifugal pump, a float for opening said conduit when liquid reaches a predetermined level in said second chamber, and means associated with said float for closing communication between said restricted conduit and said vacuum pump when the liquid in said second chamber reaches a high level.

8. Liquid pumping and air separating apparatus comprising a centrifugal pump including a rotor and a casing therefor, means for admitting mixed gas and liquid to said rotor means in said casing for transmitting fluid passing through the rotor, a separating chamber into which such transmitted fluid is discharged, a second separating chamber disposed within said first named chamber, a liquid discharge line connected to a low point of said first named chamber, a gas vent connecting said chambers at the upper portions thereof, whereby the major portion of the liquid will be removed from said first named chamber through said discharge line and the major portion of the gas with a minor amount of liquid will enter said second chamber, a vacuum pump connected to said second chamber for removing gas therefrom, a float in said chamber, a liquid return line from the bottom of said chamber to said centrifugal pump, said return line being opened to establish liquid communication between said chamber and pump when liquid entering said chamber reaches a predetermined level.

9. A liquid pumping and gas separating apparatus comprising a centrifugal pump including a rotor and a casing enclosing said rotor, a separating chamber connected to said casing to receive fluid passing through said pump, a liquid discharge line connected to said chamber, means in said chamber for causing liquid flowing therethrough to follow a tortuous path, whereby entrained gas may separate in said chamber, a second chamber in fluid communication with the first chamber adapted to receive said gas and liquid entrained therein, a vacuum pump in communication with a high point in said second chamber for exhausting gas therefrom, means responsive to pressure conditions in said chamber for disconnecting said pump when the pressure therein reaches a predetermined value, a liquid return passage extending from a low point in the second chamber to the centrifugal pump, and a float in said second chamber for controlling the opening of said return passage.

10. A liquid pumping and gas separating apparatus comprising a centrifugal pump including a rotor and a casing housing the rotor, a separating chamber exterior of said casing and in fluid communication therewith, a liquid discharge line connected to said chamber, a second chamber in fluid communication with said first named chamber, an air vent disposed at a high point in said second chamber, a check valve in said vent, a vacuum pump connected to a high point in the second chamber, means responsive to pressure conditions in said chamber for operating said vacuum pump, a liquid return passage disposed at a low point of said second chamber in fluid communication with said rotor, a float for controlling the opening of said return passage, and means associated with said float for closing the connection between said second chamber and said vacuum pump when said float reaches a predetermined elevation.

11. A liquid pumping and gas separating apparatus comprising a centrifugal pump including a rotor and a casing therefor, a separating chamber mounted above said casing and in fluid communication therewith to receive fluid discharged therefrom, a liquid discharge line connected to said chamber, baffle means in said chamber to cause liquid to flow in a tortuous path therethrough, a second separating chamber disposed within said first named chamber, a fluid connection between said chambers disposed above said liquid discharge line, means responsive to pressures within said first chamber for removing gas therefrom, said means including a vacuum pump, a liquid passage disposed at the lower portion of said second chamber communicating with said rotor, and float means in said second chamber controlling the opening of said passage.

12. A liquid pumping and gas separating apparatus comprising a horizontally disposed centrifugal rotor, a casing therefor, a drive shaft extending upwardly from said rotor, a discharge opening formed in said casing and in fluid communication with a separating chamber, said chamber being disposed above said casing and around said drive shaft, a liquid discharge line connected to said chamber at a low point thereof, a second chamber disposed within said first named chamber and concentric with said shaft, sealing means around said shaft to prevent leakage therealong from said chamber, a liquid return passage at a low point in said second chamber for returning liquid contained therein, float means in the chamber for controlling the opening of said liquid return means, an air vent at an upper point in said second chamber, means in said vent preventing the ingress of air into the chamber, a vacuum pump disposed above said second chamber, a clutch for connecting said vacuum pump to said rotor shaft, and means responsive to pressure conditions in said separating chamber for operating said clutch.

13. Apparatus for separating gas from liquid and simultaneously pumping said liquid, comprising a separating unit having a pair of chambers, a conduit connecting said chambers, centrifugal pump means for feeding liquid into one of said chambers for gravitational separation into gas and liquid bodies and for disposal of said gas body into the remaining chamber through said conduit, means for removing the gas from said remaining chamber and also for priming said centrifugal pump comprising a suction pump communicating with said remaining chamber and with the discharge side of said centrifugal pump means through said conduit and first chamber, another centrifugal pump means for removing incidental liquid fed into said remaining chamber, and float means in said remaining chamber for controlling admission of liquid to said other centrifugal pump means.

14. Apparatus for pumping liquid containing air and separating the air from such liquid prior to delivery of the liquid, comprising, in combination, a centrifugal pump, an inlet for said pump adapted to be connected to a source of liquid supply, said pump including a rotor and a casing, a discharge port in the casing, a receiving tank connected to the discharge port to receive fluid passing through said rotor, said receiving tank constituting a liquid and air separator, said tank being formed with a pair of chambers, one of said chambers being in fluid communcation with said discharge port, the other of said chambers being in communication with the first named chamber at a high point in said tank, a liquid discharge line at a low point in said first named chamber, means in the second chamber for draining therefrom liquid collecting therein, an air vent in said second chamber for the escape of air separated from said liquid, a vacuum pump interposed in said vent between said second chamber and the atmosphere, and means for operating both said centrifugal pump and said vacuum pump.

PORTER S. MORGAN.